United States Patent

Horstmann et al.

[15] 3,694,681
[45] Sept. 26, 1972

[54] PIEZOELECTRIC MOTOR

[72] Inventors: Frederick Otto Horstmann; Cecil Frank Clifford, both of Newbridge Works, Bath, Somerset, England

[22] Filed: Oct. 16, 1970

[21] Appl. No.: 81,207

[30] Foreign Application Priority Data

Oct. 21, 1969 Great Britain..........51,541/69
March 13, 1970 Great Britain..........12,073/70

[52] U.S. Cl. ......................310/8.3, 310/8.5, 310/21
[51] Int. Cl. .............................................H04r 17/00
[58] Field of Search..........310/8, 8.3, 8.5, 8.6, 21, 22, 310/25; 58/7, 116, 23 R, 23 A, 23 D, 23 TF, 23 V; 74/126; 318/154

[56] References Cited

UNITED STATES PATENTS

| | | | |
|---|---|---|---|
| 3,462,939 | 8/1969 | Tanaka et al. | 58/23 |
| 3,343,365 | 9/1967 | Vosseler | 310/8.5 X |
| 3,243,951 | 4/1966 | Kawakami | 310/8.3 X |
| 3,297,889 | 1/1967 | Breskend | 310/8.1 |
| 3,566,167 | 2/1971 | Raval | 310/21 |
| 3,485,032 | 12/1969 | Ishikawa et al. | 58/23 TF |
| 3,225,226 | 12/1965 | Kawakami | 310/8.3 X |
| 3,504,206 | 3/1970 | Fritsch | 310/8.3 X |

Primary Examiner—J. D. Miller
Assistant Examiner—Mark O. Budd
Attorney—Emory L. Groff and Emory L. Groff, Jr.

[57] ABSTRACT

An electromechanical motor has a piezoelectric reed, anchored at one end and co-operating at its free end with a rotor. The rotor or the reed is provided with a wavy track, for example a flux gap, or a magnetic element which forms a magnetic coupling with a magnetic element or elements carried by the reed or rotor respectively. Upon the application of an alternating driving voltage to the piezoelectric reed, at a frequency other than the natural frequency of the reed, the latter undergoes flexural oscillations which induce rotation of the rotor through the magnetic coupling.

3 Claims, 8 Drawing Figures

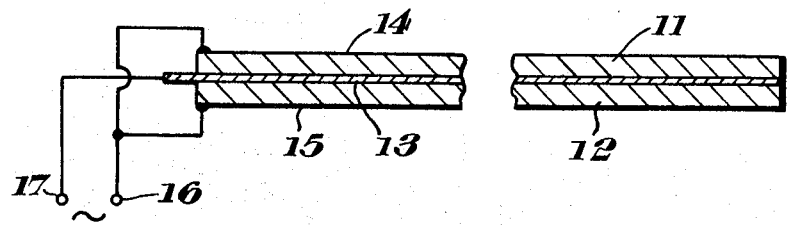
Fig. 1.
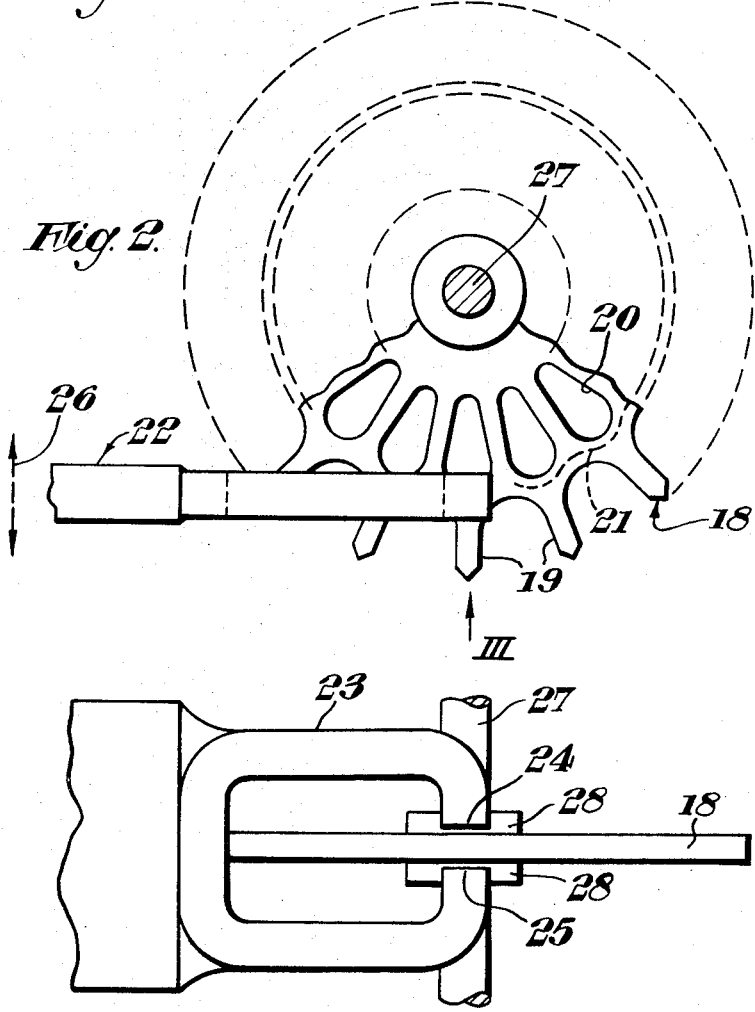
Fig. 2.
Fig. 3.

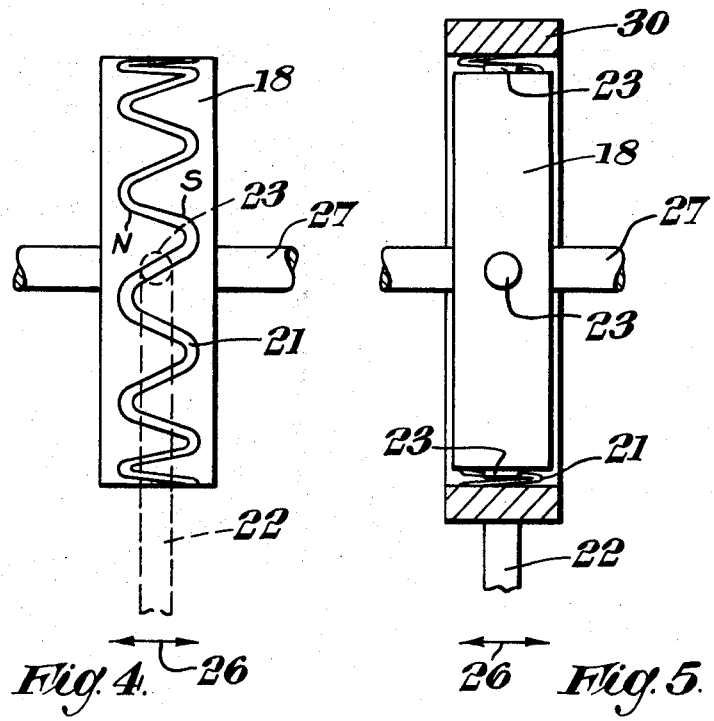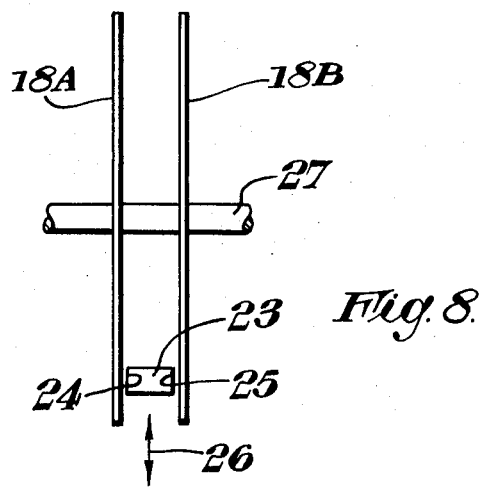

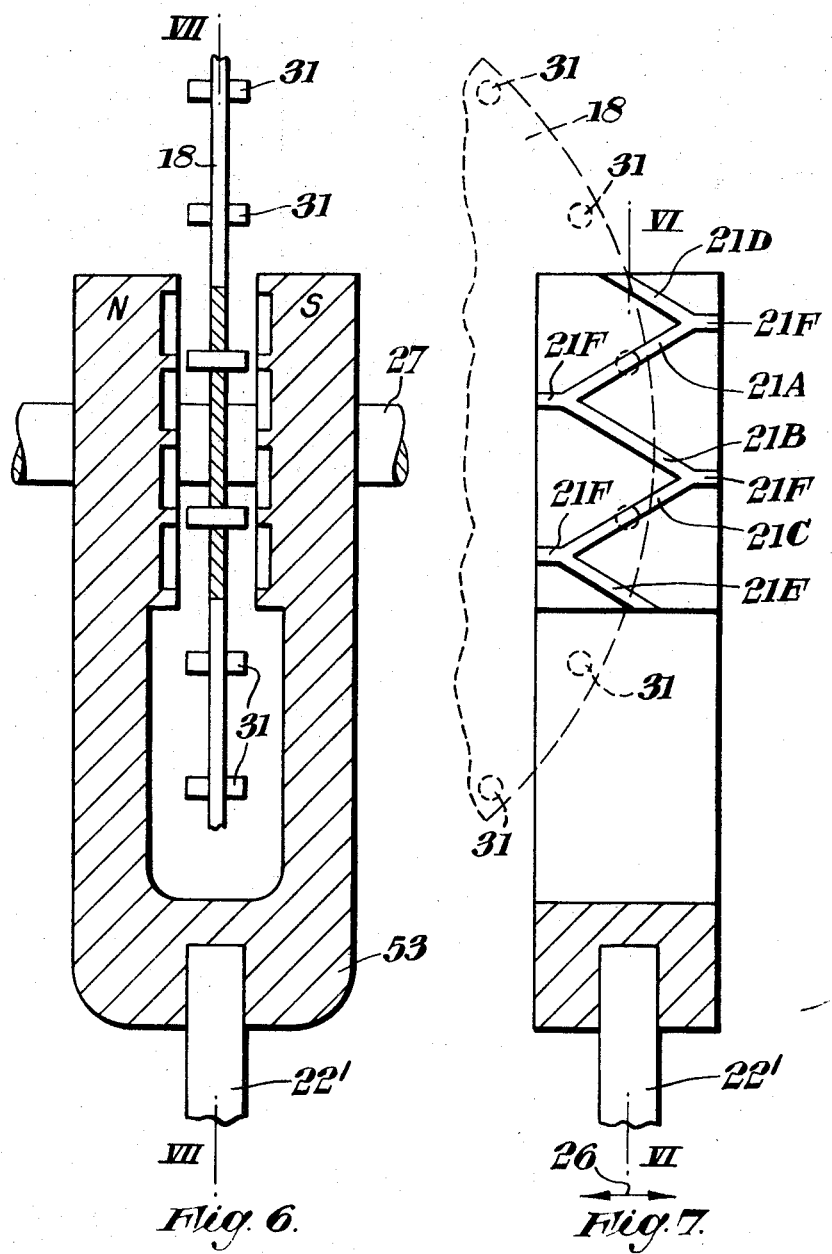

PIEZOELECTRIC MOTOR

This invention relates to electromechanical motors in which a mechanically oscillating member is maintained in oscillation by electrical means, and more particularly to a type of electromechanical motor in which the oscillating member has piezoelectric characteristics.

A magnetic escapement has been known for many years in which a magnetic coupling is employed between a rotor and a member which oscillates mechanically at its natural frequency and controls the speed at which the rotor rotates. Such magnetic escapements have been disclosed, for example, in British Pat. specifications Nos. 596,216 and 660,584. In these escapements the rotor is driven by a spring or an electric motor and its rate of rotation is controlled by electromechanically induced flexural oscillations of a reed embodying a magnet which co-operates with a wavy magnetic track associated with the rotor in the form of an escape wheel. In these magnetic escapements the rotor is driven by a spring or an electric motor, and the spring or motor also serves to drive the remainder of the timing mechanism which may, for example, be a clock embodying second, minute and hour hands, the magnetic escapement serving only to control the speed of rotation of the timing mechanism.

More recently a good deal of effort has been devoted to producing electromechanical motors in which either a single reed or a tuning fork is maintained in mechanical oscillation by electrical means and by virtue of a magnetic coupling the rotor is caused to rotate. In such motors the spring or motor for driving the rotor directly is omitted and the magnetic escapement now becomes a magnetic drive which must not only rotate the rotor at the correct speed but must also provide it with sufficient torque to drive the whole of the timing mechanism. Hence a magnetic drive capable of exerting a more powerful torque upon the rotor is necessary. Moreover, it is highly desirable that the motor should be self-starting.

In the known electromechanical rotor having an electromechanically oscillating reed, it is usual to provide a transducer which is associated with the oscillating end of the reed or with one or both tines of a tuning fork. In one form of oscillator using a single reed clamped at one end, at least one permanent magnet is carried on the free end of the reed and this co-operates with two coils, one being a signal coil and the other a driving coil. The electromagnetically induced oscillation of the reed induces a small alternating signal in the signal coil and this is applied to the base of a single transistor amplifier. During at least one half of the alternating cycle of the signal the transistor is cut off and during the remainder of the cycle the transistor conducts. The collector current of the transistor is passed through the driving coil to produce a series of unidirectional magnetic pulses which coact with the magnet or magnets and maintain the reed in oscillation. A similar or equivalent transducer arrangement is applied to the tuning fork.

In the course of research and development work on known electromechanical motors spread over a considerable number of years it has been found that the self-starting characteristics of such motors (that is to say the commencement of rotation of the rotor) are unreliable, although many different arrangements and variations of these arrangements were tried. Experimental work on electromechanical motors operating in the range 100 to 360 Hz indicates that very careful design is necessary to provide reliable self-starting of conventional electromechanical motors of the kind referred to above. The comparatively heavy rotors necessary to convert a frequency of 50 Hz into rotation and to provide a torque of, say, 10 gram-centimeters at a shaft geared to run at 1 r.p.m. appeared unlikely to provide good self-starting characteristics and have not been investigated by workers in the field of electromechanical motors. The efforts to obtain reliable self-starting were made because it is important that a modern clock or timing mechanism should be self-starting.

The problem of starting has two aspects. It is necessary first for the oscillating member of the motor, that is, the reed, to commence its oscillation. It is then necessary for the oscillating member to start the rotation of the rotor. Unless both these actions take place no rotary output is obtained and the motor is not self-starting.

The electromechanical motor using either an electromagnetically oscillating reed or a tuning fork combined with a magnetic drive has many advantages, an important one being that it is possible to provide a clock which keeps very accurate time at a very reasonable price, and in consequence the problem of starting has been studied by numerous investigators.

One proposal for self-starting has been disclosed in an Address presented by Kawakami and Chida to the *Colloque International de Chronometrie* in Paris in September 1969. In the original magnetic escapement the oscillating member straddled the escape wheel and had two inturned horns which closely approached the opposite faces of the escape wheel, and respectively presented N and S magnetic poles thereto. The modification proposed by Kawakami and Chida is to provide the oscillating member with three magnetic poles on each side of the escape wheel, the three poles on each side being unequally spaced from each other. It is not possible to say whether this proposal will provide completely reliable self-starting until clocks and other timing mechanisms incorporating it have been in use for a considerable time.

A new type of reed has recently appeared which depends upon piezoelectric characteristics and which includes two oppositely polarized piezoelectric strip elements which are so connected that if one end of the reed is clamped and an alternating current supply, for example, the ordinary 240 volts 50 Hz single phase supply mains, is applies across the two piezoelectric elements, the reed will undergo flexural oscillations at a frequency which is not governed by its own natural frequency (which may be far above the applied alternating supply frequency) but rather by the frequency of the applied alternating current supply. If has been proposed to use such a reed to provide a rotary drive for a clock by attaching a spring pawl to the free or oscillating end of the reed which co-operates with a ratchet wheel to provide a pawl and ratchet drive in which the ratchet wheel is rotated by one tooth for each complete cycle of oscillation of the piezoelectric reed. Only the energy developed by the reed during one half of each cycle of oscillation is used. Moreover, the spring pawl will tend to drag the ratchet wheel backwards during its return movement and it is necessary to provide a second spring pawl which is anchored to a part of the fixed structure of the device in order to prevent such reverse rotation of the ratchet wheel. This introduces additional losses, so that the proportion of the available energy in the reed which is usefully employed to drive the rotor may be as low as one quarter. In addition to its low efficiency, such a pawl and ratchet drive produces considerable noise and there are three parts — the two pawls and the ratchet wheel — which are subject to wear.

A piezoelectric reed has been subjected by the applicants to a series of tests in conjunction with a magnetic drive with a view to providing a rotary output. It was found that, in addition to providing a rotary output the combination of the piezoelectric reed and the magnetic drive could provide absolutely reliable self-starting of the combination despite the fact that a comparatively heavy rotor is required for operation at the mains supply frequency. The rotor may start in either direction but it can be depended upon to start without fail as soon as the energizing supply voltage is applied to the piezoelectric reed. It is not difficult to arrange that the mechanism can run in a desired direction only.

The fact that such a combination provides instant and absolutely reliable self-starting was not only quite unexpected, but is an extremely useful feature, especially as the new reed is suitable for direct connection to the mains electrical supply and may therefore be embodied in a synchronous mains drive clock or timing mechanism in which the customary synchronous motor is replaced by the combination of the oscillating piezoelectric reed with magnetic drive. This at once disposes of several drawbacks which are inherent in conventional synchronous motors used to drive known types of mains driven clocks and timing mechanisms such as time switches.

From the foregoing discussion it will be evident that reliable self-starting of a motor having an electromechanical oscillator, and a rotor suitable for use with a supply mains frequency of 50 Hz (or 60 Hz) was not hitherto considered practical for producing a useful torque for driving timing mechanisms. The piezoelectric reed with a mechanical drive is noisy and its useful life and efficiency are doubtful. In contrast, the piezoelectric reed in combination with a magnetic drive forms the ideal combination, in providing completely reliable self-starting with good torque and efficiency silence in running and long life.

According therefore to the present invention there is an electromechanical motor comprising a piezoelectric reed so arranged that when an alternating electrical voltage is applied to the reed the latter undergoes flexural oscillations at the frequency of said alternating voltage, and a magnetic coupling between the reed and a rotor for transmitting torque to cause rotation of the rotor relative to the reed upon the application of said alternating electrical voltage to the reed.

Preferably the piezoelectric reed is anchored at one end and carries at its free end at least one magnetic element arranged in juxtaposition to the rotor to oscillate in a generally radial direction with respect to the rotor axis upon oscillation of the reed. The rotor is preferably formed with a wavy magnetic track which is intersected by the flux of the or each said magnetic element and which undulates about a mean radius substantially the same as the radial distance of the mean position of said magnetic element(s) from said rotor axis.

In preferred embodiments of the invention the piezoelectric reed comprises two piezoelectric laminar elements bonded to opposite faces of a conductive strip and arranged with opposite polarization, respective electrodes being connected to or deposited on the outer faces of the laminar elements for connection to one pole of an alternating current supply, and the central conductive strip being connectible to the other pole of said supply.

In an alternative preferred embodiment the piezoelectric reed is anchored at one end and carries at its free end an oscillatory head formed with a wavy magnetic track which is arranged in juxtaposition to the rotor, the latter carrying a plurality of permanent magnets which are spaced from different regions of the said magnetic track, the undulations of the wavy track being in a direction parallel to the rotor axis with respect to a circumferentially continuous line, and the direction of oscillation of the track relative to the rotor upon flexural oscillation of the reed being also in a direction parallel to the rotor axis.

In a further alternative embodiment the piezoelectric reed is anchored at one end and carries at least one magnetically conductive member at its free end, arranged to oscillate in juxtaposition to a wavy magnetic track in the form of a flux gap defined between permanent magnetic parts of opposite polarity on the rotor, the direction of undulation of the flux gap being parallel to the direction of oscillation of the magnetically conductive member upon oscillation of the reed.

According to yet another embodiment of the invention the or each magnetic element carried by the reed comprises a permanent magnet having a wavy magnetic track formed on a face directed towards a corresponding face of the rotor, which rotor face is provided with a number of projections or teeth of magnetically conductive material spaced apart at circumferential intervals by substantially one wavelength, or a multiple of one wavelength, of the said wavy track.

In another embodiment of the invention the rotor has a wavy magnetic track lying on a cylindrical surface coaxial with the rotor axis, the piezoelectric reed being anchored at one end and carrying at its free end an annular magnetic element arranged coaxially with the said cylindrical surface and provided with a number of poles co-operating with the track, said magnetic element oscillating in a direction parallel to the rotor axis.

Selected embodiments of the invention will now be described, by way of example, with reference to the accompanying drawings in which:

FIG. 1 is an enlarged longitudinal cross-section of one form of piezoelectric reed for use in a motor according to the invention;

FIG. 2 is a diagrammatic plan view, partly broken away, of an electromechanical motor according to one embodiment of the invention;

FIG. 3 is a side elevation of the motor of FIG. 2, from the direction of arrow III in FIG. 2;

FIG. 4 is an elevation of a rotor for an electromechanical motor according to a second embodiment of the invention, the oscillating reed of the motor being indicated in dotted lines;

FIG. 5 shows diagrammatically in section an oscillating head on the free end of a piezoelectric reed, the oscillating head and rotor of a third embodiment of the invention;

FIGS. 6 and 7 show diagrammatically a fourth embodiment of the invention having an oscillating head mounted on the free end of a piezoelectric reed, FIG. 6 being a section on the line VI—VI of FIG. 7, and FIG. 7 being a section on the line VII—VII of FIG. 6; and FIG. 8 shows a double rotor on a single spindle with a magnet mounted on the oscillating member lying between the two parts of the double rotor, according to a fifth embodiment of the invention.

Referring to FIG. 1 of the drawings, a piezoelectric oscillating reed comprises two piezoelectric laminar elements respectively 11 and 12, which are in the form of thin slips of material. The two elements 11, 12 are bonded to opposite faces of a central metallic strip 13 and they are arranged with opposite polarization. The outer faces of the elements 11, 12 are covered with thin metallic electrode layers, respectively 14 and 15, which may be formed by depositing a thin layer of metal on each face. To use the reed one end is clamped in any convenient manner and electrical connections are made to the clamped end, the metallic layers 14 and 15 being electrically interconnected and connected to one pole 16 of an alternating current supply while the central metal strip 13 is connected to the other pole 17 of the alternating current supply. It is possible to make these piezoelectric reeds with such characteristics that the terminals 16 and 17 may be connected to an ordinary domestic supply at the standard voltage and frequency of 240 volts, 50 Hz (or 60 Hz) so that a very simple oscillator is provided.

The two piezoelectric elements 11 and 12 are assembled with opposite polarity so that they both bend in the same direction when the terminals 16 and 17 are of one polarity and in the opposite direction when the polarity reverses. Hence the reed shown in FIG. 1 will, when connected to a 50 Hz alternating current supply, undergo flexural oscillations at a frequency of 50 Hz in a direction perpendicular to the plane of the strip 13, that is, in the plane of FIG. 1.

When not connected to an electrical alternating supply the piezoelectric reed is stiff and has a natural frequency of oscillation (without the application of an electrical voltage) is far above the normal operating frequency, so that there is no possibility of any difficulty arising due to interaction between the electrical and mechanical frequencies. This is in contrast with an ordinary mechanically vibrating reed, which is commonly arranged so that its natural frequency is exactly 50 Hz, then it will undergo resonance oscillation with a maximum amplitude if the alternating electrical supply frequency is the same as the natural mechanical frequency of the reed. If, however, the supply frequency should rise or fall slightly then the oscillation amplitude of the reed falls very considerably. Since in practice the frequency of alternating current mains may fluctuate between about 48.5 Hz and 50.5 Hz under conditions respectively of heavy load or "making up" time after a period of heavy load, the amplitude of the oscillations of the reed may vary considerably if the natural mechanical frequency of the reed is the same as the nominal electrical excitation frequency. Where such a reed is used to provide a rotary drive using a magnetic coupling, the very large variation in oscillation amplitude which takes place as a result of a comparatively small change in mains frequency might result in mechanical damage to the parts. This difficulty is avoided when the higher frequency piezoelectric reed is used because amplitude of oscillation of the reed is then directly dependent upon supply voltage and will only vary by the few per cent which is the maximum variation normally allowed in the mains supply voltage.

FIGS. 2 and 3 show the application of a piezoelectric reed of the kind shown in FIG. 1 to an electromechanical motor.

A rotary escape wheel, generally indicated by reference 18, is made of a disc of ferromagnetic material having a thickness of 0.015 inch to 0.02 inch. The wheel 18 is punched to form a series of radially projecting teeth 19 and elongate openings 20. Each opening 20 is in radial alignment with one of the teeth 19 and the dimensions are so chosen that a wavy magnetic track, indicated by the dotted line 21, is formed around each face. The piezoelectric reed, generally indicated by reference 22, is anchored at one end and so mounted that its longitudinal axis is tangential to the mean or pitch circle of the wavy magnetic track. A small horseshoe permanent magnet 23 is fastened to the face end of the piezoelectric reed 22, the magnet 23 having two pole pieces 24 and 25 the faces of which are close to and parallel to opposite faces of the escape wheel 18. The magnet 23 is shaped to form a closed magnetic circuit with the periphery of the wheel positioned in the flux gap between the pole pieces 24 and 25, so that the pitch circle of the wavy magnetic track 21 is located centrally in said flux gap.

The direction of oscillation of the free end of the reed 22 upon flexural oscillation of the reed is in a generally radial direction with respect to the axis of the rotary wheel 18, that is, in the same direction as the undulations of the wavy magnetic track 21. When the reed 22 is energized it therefore oscillates flexurally in the direction of the double-headed arrow 26 and, because the wavy magnetic track lies between the magnet poles 24 and 25, the escape wheel 18 is caused to rotate at a constant speed dependent upon the oscillation frequency of the reed and the number of waves in the wavy magnetic track 21 of the escape wheel. The wheel 18 is conveniently carried on a shaft or spindle 27 provided with flanges 28 on opposite faces of the wheel 18 so that the latter may be arranged to run true.

It has been found that the oscillatory power of a piezoelectric reed is rather greater than that of an ordinary electro-mechanically oscillating reed driven by a small amplifier, but the normal oscillation amplitude of the piezoelectric reed is rather less than is obtainable with the ordinary electro-mechanical reed. This is possibly due to the fact that the piezoelectric reed must be designed so as to avoid flexural strain beyond a certain point, because of the nature of the piezoelectric material and the danger of fracturing the reed if the oscillation amplitude is made too high. The oscillation amplitude will, of course, depend upon the applied voltage, and if the reed is connected to an ordinary alternating mains electric supply its amplitude will only vary by a few percent on either side of a mean with typical variations of the mains voltage.

A study has been made of the piezoelectric reed in an endeavor to explain why perfect self-starting is achieved, and it is thought that this is due to the difference in starting characteristics between the piezoelectric reed and the electrically maintained mechanically oscillating reed. When the amplifier of the purely electro-mechanical oscillating reed is first switched on a very tiny current surge is produced and this produces a correspondingly small movement of the reed. This movement causes a small signal to be induced in the signal coil which is amplified and applied to the reed to cause it to make a movement of slightly larger amplitude at the next cycle, and so on, so that the oscillation amplitude of the reed builds up gradually. Hence, during the initial period the oscillation amplitude of the reed is too small to enable the magnet poles to ride over the crest of the first wave in the wavy magnetic track, so that the escape wheel tends to go into rotary oscillation instead of running. The piezoelectric reed, on the other hand, will faithfully follow the voltage wave applied to it, and since the voltage wave has a constant amplitude the piezoelectric reed will oscillate at its full amplitude during the first cycle and cause the escape wheel 18 to start.

Once started, the wheel 18 will continue to rotate in the same direction. In order to ensure that the escape wheel always starts rotation in the same direction a small wedge-shaped projection is provided on the escape wheel 18 or to a separate disc mounted on the spindle 27. This wedge-shaped projection co-operates with a spring which is arranged in the manner of a spring pawl so that if the escape wheel 18 starts to rotate in the wrong direction the wedge-shaped projection strikes the spring and the wheel is thrown back in the opposite direction. When the wheel 18 is rotating in the correct direction an inclined surface of the wedge-shaped projection merely deflects the spring slightly at each revolution, permitting continued rotation of the wheel in the correct direction.

The motor according to the invention utilizes both halves of each cycle of reed oscillation, and is also inherently silent in operation since there is no mechanical contact between the oscillating reed and the driven rotor.

Some further embodiments of the invention well now be described with reference to FIGS. 4 to 8, the same reference numerals being used to indicate the same or corresponding component parts.

FIG. 4 shows a cylindrical rotor 18 having a wavy magnetic track 21 formed around its periphery and lying on a cylindrical surface coaxial with the axis of the rotor, the rotor 18 being carried on a spindle 27. The track 21 may be raised above the surface of the cylindrical rotor, although it is not shown in relief in FIG. 2 to avoid detracting from the clarity of the drawing. Alternatively the track 21 could be formed by two disc-like permanent magnet parts of opposite polarity placed upon the spindle 27, each magnet part having one edge scalloped to define one edge of the wavy magnetic track 21, the track itself being in the form of a flux gap between the edges of the two magnet parts, the latter being so magnetized that one edge of the said flux gap is a continuous South pole, indicated by the letter S, and the other edge of the track is a continuous North pole, indicated by the letter N.

The oscillating reed 22 in the embodiment of FIG. 4 is indicated in dotted lines and it oscillates in the direction indicated by the double-headed arrow 26. A magnetic member 23 indicated by dotted lines is attached to the end of the reed 22. If the track 21 is formed of a magnetically conductive material such as soft iron the member 23 is a permanent magnet, but if the track is formed by the flux gap between two separate disc-like permanent magnets with scalloped edges to define the track, the magnetic member 23 is made of a magnetically conductive material of high permeability and low retentivity such as soft iron. The magnetic member 23 may alternatively comprise an annular member coaxial with and surrounding the track 21 and provided with a number of magnetic poles co-operating with the track and spaced apart circumferentially at intervals of one wavelength, or an integral multiple of one wavelength, of the track 21.

FIG. 5 shows another embodiment in which the rotor is a cylinder 18 mounted on a spindle 27. An oscillating head is in the form of a ring 30 mounted on the free end of the oscillating piezoelectric reed 22, which oscillates in the direction of the double-headed arrow 26. The ring 20 is formed internally with a wavy magnetic track 21, only the ends of which can be seen. The rotor cylinder 18 carries four permanent magnets 23 projecting radially, of which three are visible. By using a plurality of magnets 23 a higher rotor torque may be obtained, especially as the piezoelectric reed 21, being driven by the supply mains, is able to develop considerable oscillatory energy.

FIGS. 6 and 7 show another form of electro-mechanical motor in which an oscillating head embodying a wavy magnetic track is carried on a piezoelectric reed, part of the rotor 18 being indicated in dotted lines in FIG. 7. The rotor 18 is made of non-magnetic material and has pins 31 made of magnetic material, preferably material of high permeability and low retentivity, spaced around its circumference at a short distance from its edge. The rotor 18 co-operates with an oscillating head 30 carried on a pin 22 attached to the piezoelectric reed (not shown) and it oscillates in the direction indicated by the double-headed arrow 26.

The oscillating head 30 consists of a permanent horseshoe magnet 23 having inwardly directed pole faces each of which is formed with a projecting wavy magnetic track. The track shown in FIG. 7 comprises three straight long sections 21A, 21B, and 21C, set at equal angles to the direction of oscillation 26 and having their ends joined, with short end sections 21D and 21E joined to the adjacent long sections to form a wavy magnetic track with waves having straight sides. Short lateral sections 21F are provided at the junctions of the long sections 21A, 21B and 21C. The pins 31 of the rotor are spaced from each other by a chordal distance equal to one wavelength, or a multiple of one wavelength, of the track, as shown in FIG. 7.

FIG. 8 shows part of a motor having a double rotor consisting of two parts 18A and 18B mounted on a common spindle 27. The two parts 18A and 18B may be of similar form to the rotor 18 shown in FIGS. 2 and 3 having a wavy magnetic track (not shown) defined between radially aligned teeth and openings in both rotor parts. A permanent magnet 23 is carried on the free end of an oscillating piezoelectric reed and oscillates in the direction indicated by the double-headed arrow 26, so that one pole 24 of the magnet 23 co-operates with the track on rotor part 18A while the other pole 25 of the magnet 23 co-operates with the other rotor part 18B. The use of a double rotor in this way is another means of providing a high torque.

We claim:

1. An electromechanical motor comprising in combination: a rotor; a piezoelectrically driven reed anchored at one end and free at its other end; an oscillatory head carried at the free end of the reed and formed with a wavy magnetic track which is arranged in juxtaposition to the rotor, the latter carrying a regions of the said magnetic track, the undulations of the wavy track being in a direction parallel to the rotor axis with respect to a circumferentially continuous line, and the direction of oscillation of the track relative to the rotor upon flexural oscillation of the reed being also in a direction parallel to the rotor axis, electrode means on opposite faces of the reed, means applying an alternating electrical voltage, at a frequency substantially less than the natural frequency of the reed, to the electrode means to cause flexural non-resonant oscillations of the reed at the frequency of said alternating voltage, and magnetic coupling means between the reed and the rotor effective to transmit torque and to cause rotation of the rotor relative to the reed upon the application of said alternating electrical voltage to the said electrode means.

2. An electromechanical motor comprising in combination a rotor; a piezoelectrically driven reed anchored at one end and free at its other end, at least one magnetically conductive member carried at the free end of the reed, said rotor comprising permanent magnetic parts of opposite polarity defining a wavy magnetic track in the form of a flux gap between said permanent magnetic parts, the magnetically conductive member oscillating in juxtaposition to said track and the direction of undulation of the flux gap being parallel to the direction of oscillation of the magnetically conductive member upon flexural oscillation of the reed; electrode means on opposite faces of the reed, means applying an alternating electrical voltage, at a frequency substantially less than the natural frequency of the reed, to the electrode means to cause flexural non-resonant oscillations of the reed at the frequency of said alternating voltage, and magnetic coupling means between the reed and the rotor effective to transmit torque and to cause rotation of the rotor relative to the reed upon the application of said alternating electrical voltage to the said electrode means.

3. An electromechanical motor comprising in combination a rotor; a piezoelectrically driven reed anchored at one end and free at its other end, at least one magnetic element carried at the free end of the reed and comprising a permanent magnet arranged in juxtaposition to the rotor and having a wavy magnetic track formed on a face directed towards a corresponding face of the rotor, which rotor face is provided with a number of projections of magnetically conductive material spaced apart at circumferential intervals by at least one whole wavelength of the said wavy track; electrode means on opposite faces of the reed, means applying an alternating electrical voltage, at a frequency substantially less than the natural frequency of the reed, to the electrode means to cause flexural non-resonant oscillations of the reed at the frequency of said alternating voltage, and magnetic coupling means between the reed and the rotor effective to transmit torque and to cause rotation of the rotor relative to the reed upon the application of said alternating electrical voltage to the said electrode means.

* * * * *

UNITED STATES PATENT OFFICE
CERTIFICATE OF CORRECTION

Patent No. 3,694,681　　　　　　　　　　Dated September 26, 1972

Inventor(s) FREDERICK OTTO HORSTMANN ET AL

It is certified that error appears in the above-identified patent and that said Letters Patent are hereby corrected as shown below:

In Col. 9, Claim 1, line 16, after "a" insert --plurality of permanent magnets which are spaced from different--.

Signed and sealed this 29th day of January 1974.

(SEAL)
Attest:

EDWARD M. FLETCHER, JR.　　　　　　RENE D. TEGTMEYER
Attesting Officer　　　　　　　　　Acting Commissioner of Patents